United States Patent [19]

Eickmann

[11] Patent Number: 4,613,098
[45] Date of Patent: Sep. 23, 1986

[54] DEVICES WHICH MAY BE BORNE IN AIR AND ON DEVICES APPLICABLE THEREIN

[76] Inventor: Karl Eickmann, 2420 Isshiki, Hayama-machi, Kanagawa-ken, Japan

[21] Appl. No.: 609,056

[22] Filed: May 10, 1984

Related U.S. Application Data

[63] Continuation-in-part of Ser. No. 308,202, Oct. 2, 1981, Pat. No. 4,452,411.

[51] Int. Cl.⁴ .............................................. B64C 3/38
[52] U.S. Cl. ................................. 244/46; 244/45 R; 244/7 C; 244/12.4
[58] Field of Search ............... 244/45 R, 12.1, 12.5, 244/46, 7 R, 7 C, 217, 48, 60, 65, 66, 56, 12.4

[56] References Cited

U.S. PATENT DOCUMENTS

| | | | |
|---|---|---|---|
| 1,726,062 | 8/1929 | Gilman | 244/25 |
| 2,170,958 | 8/1939 | Andrews | 244/65 |
| 3,179,354 | 4/1965 | Alvarez-Calderon | 244/7 R |
| 3,776,491 | 12/1973 | Oulton | 244/218 |

OTHER PUBLICATIONS

"Mini-Introduction to a New Technology", Karl Eickmann, Air Mail ed. J, p. 73.

Primary Examiner—Trygve M. Blix
Assistant Examiner—Rodney Corl

[57] ABSTRACT

A rotor having airfoil section shaped blades is set into a fluid stream. Over a connection or transmission means a propeller is connected to the rotor. The fluid stream whereinto the rotor is set gives airflow energy to the rotor and revolves the rotor. The propeller is driven by the rotor over the connection or transmission means. Since the propeller is revolved by the rotor in the fluid stream, the propeller provides a thrust. The thrust may be used to lift a weight or to drive a member. A suitable application of the arrangement is, for example, to transform a multibladed helicopter into a gliding craft which descends under a gliding angle towards the surface of the earth when the helicopter has a complete engine failure. Auto-rotation accidents can thereby be prevented. The device is also applicable to drive a vehicle or to lift a weight. Variable means can be applied to obtain variable thrusts in flying craft to improve their efficiencies or change from one flight system to another flight system. In other embodiments several novel concepts for air-borne craft are provided which include emergency landing devices, retractable and extendable or relation varifying devices for wings or propellers.

3 Claims, 26 Drawing Figures

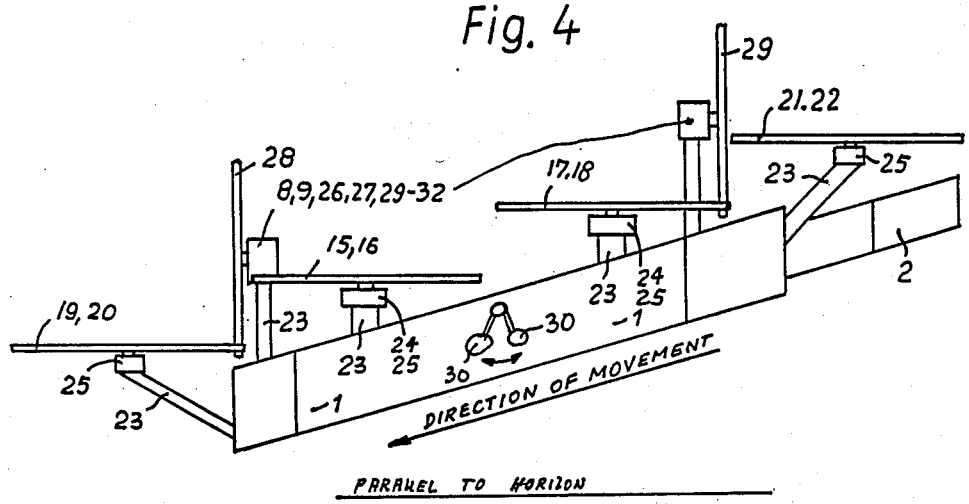
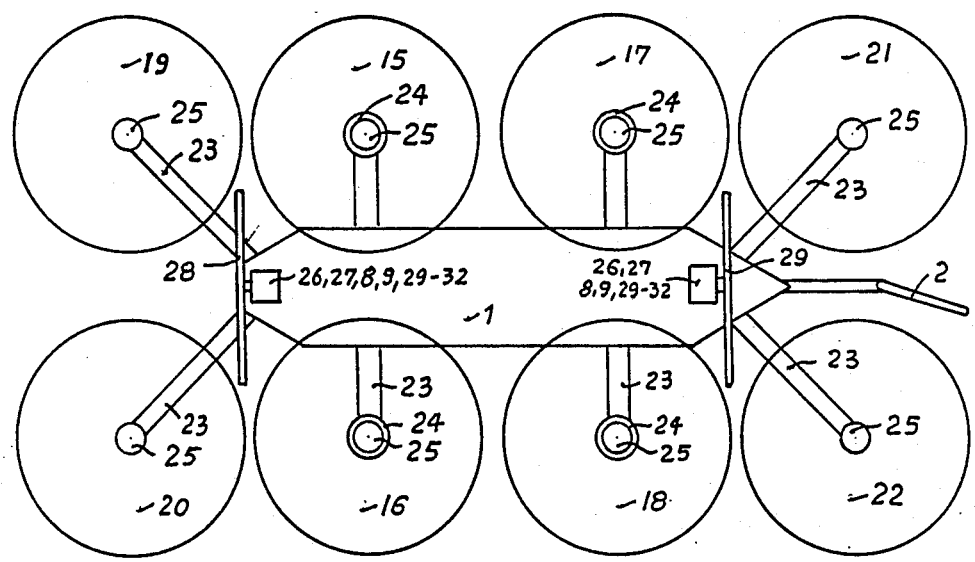

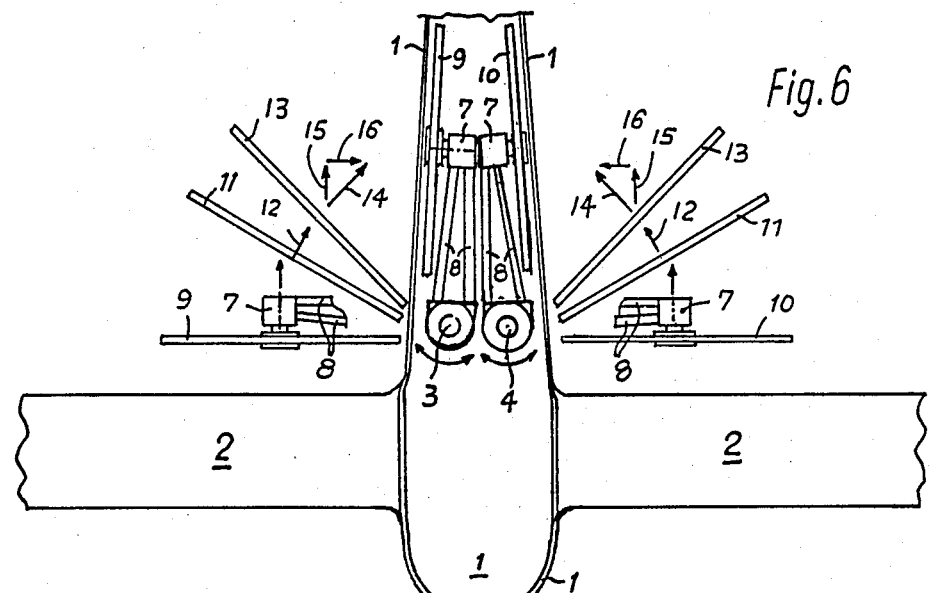
Fig. 6
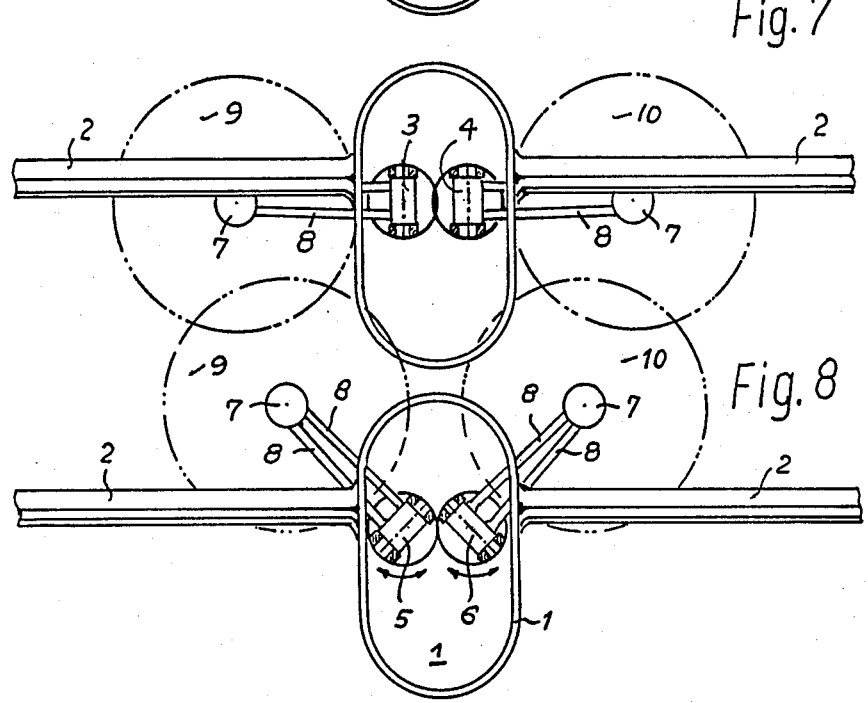
Fig. 7
Fig. 8

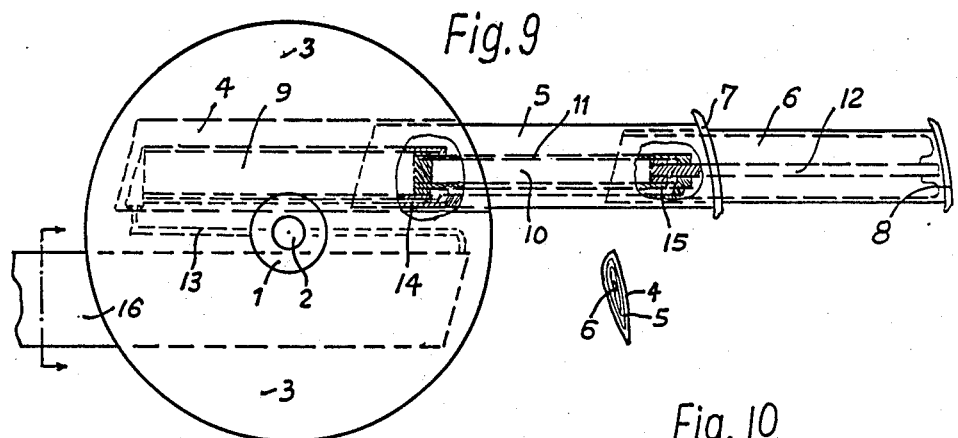
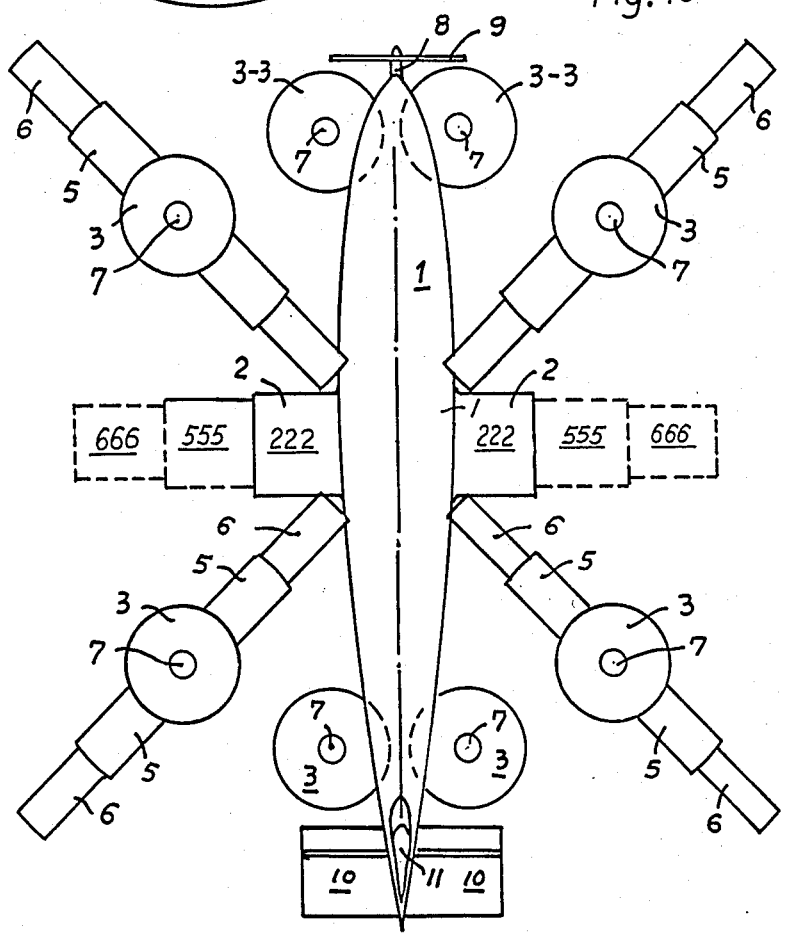

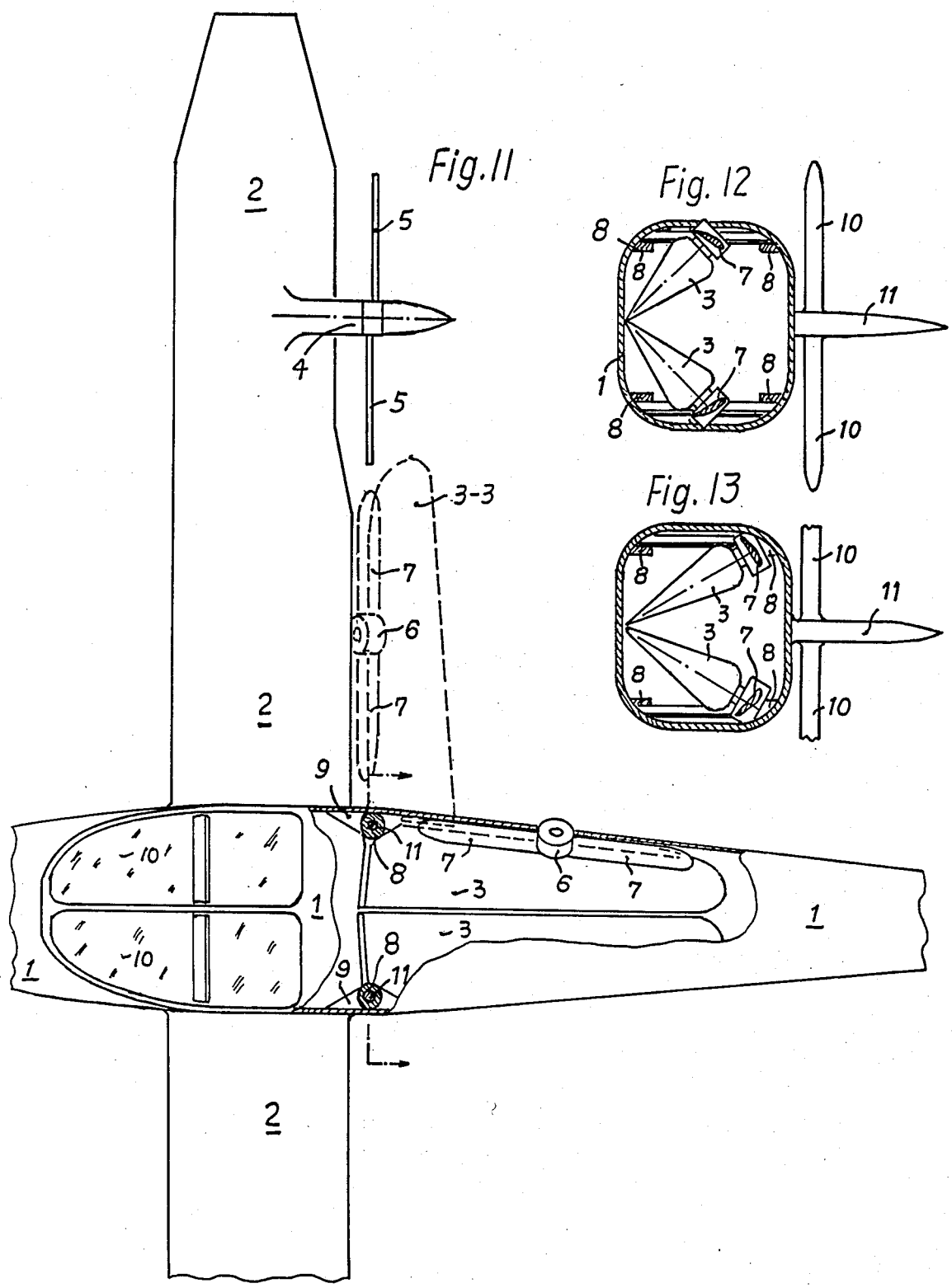

Fig. 21

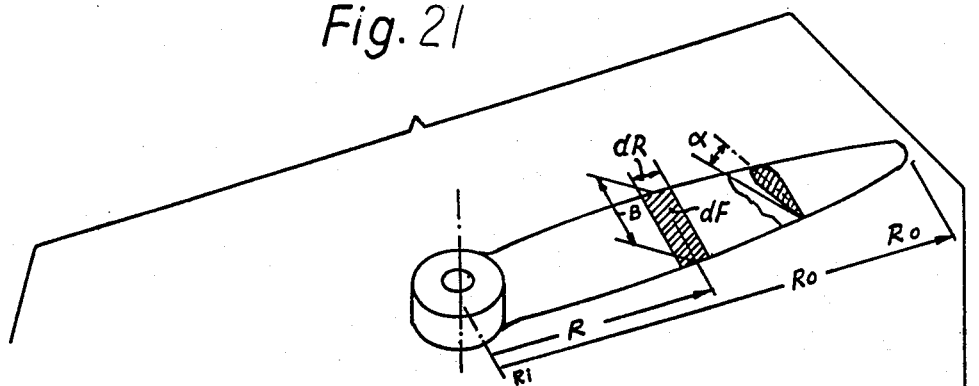

$\omega$ = angular velocity = $1/s$     $n$ = Rpm
$\omega = \pi n/30$;   $\pi = 3.14...$
$g$ = density of air; f.e. $0.125 \, Kgs^2/m^4$ near sea level.
$C_a$ = Coefficient of Lift     $Md$ = Moment = TORQUE
$C_w$ = Coefficient of resistance     Lift = $W(c_a/c_w)$
$W$ = RESISTANCE     $L$ = Lift
$N$ = POWER REQUIRED     $\overline{(\ )}$ = Integral mean values
$K$ = Konstant = $(g/2)C_w$     $F$ = AREA
$W = (g/2) C_w F V^2 = K F V^2$     $L = (g/2) F C_a V^2 = W(c_a/c_w)$
$V = 2R \pi n/60 = m/s =$     $V = R\omega$
$E = K\omega^2$    $M = (1/3)E$    $S = (1/4)E$    $T = (1/5)E$

DEVELOPMENT OF THE FORMULAS:

$dV = \omega dR$;    $V = \int \omega dR$    $V = \omega R$    $\overline{V} = \int \omega dR / \Delta R = \frac{1}{2}\omega R^2$ $dW = K\omega^2 dF R^2 = E R^2 dF = E R^2 dB dR$ $W = \int dW = \int E R^2 \overline{B} dR = E\overline{B} \int R^2 dR = E B (1/3)(R_2^3 - R_1^3)$ if B is constant, as in TYPE ①

$dMd = K\omega^2 R^3 dF = E R^3 dF = E R^3 dB dR$ $Md = \int dMd = \int E R^3 \overline{B} dR = E\overline{B} \int R^3 dR = E B (1/4)(R_2^4 - R_1^4)$ if B is constant For B linear inclined: 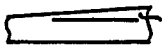 J: J introduced. $J = \left(\frac{\Delta Q}{\Delta R}\right)$ TYPE ③:   $W = E(q + JR) R^2 dR = Eq \, 1/3 R^3 + EJ \, 1/4 R^4$
        $Md = E(q + JR) R^3 dR = Eq \, 1/4 R^4 + EJ \, 1/5 R^5$ TYPE ②:   $W = E(Q - JR) R^2 dR = EQ \, 1/3 R^3 - EJ \, 1/4 R^4$
        $Md = E(Q - JR) R^3 dR = EQ \, 1/4 R^4 - EJ \, 1/5 R^5$

OR:

TYPE ③:     $W = Mq(R_2^3 - R_1^3) + SJ(R_2^4 - R_1^4)$
             $Md = Sq(R_2^4 - R_1^4) + TJ(R_2^5 - R_1^5)$

TYPE ②:     $W = MQ(R_2^3 - R_1^3) - SJ(R_2^4 - R_1^4)$
             $Md = SQ(R_2^4 - R_1^4) - TJ(R_2^5 - R_1^5)$

TYPE ⑤:   CALCULATE INNER-MEDIAL-AND OUTER-PORTIONS BY ABOVE EQUATIONS. FOR OUTER PORTION USE Q' INSTEAD OF Q.    $Q' = q_2 + J_2 R$   ($R = R_{0} abin$)

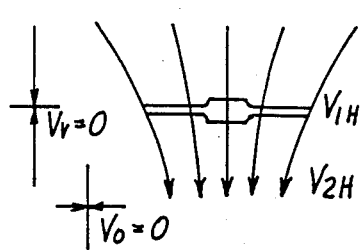
Fig. 22-C
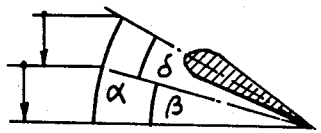
Fig. 22-A
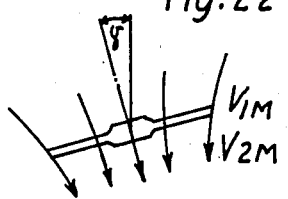
Fig. 22-D
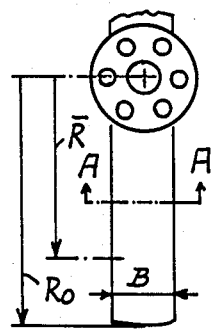
Fig. 22-B
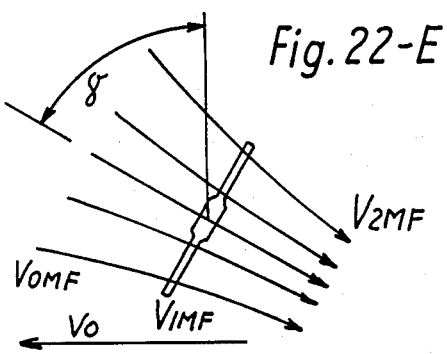
Fig. 22-E

DEVICES WHICH MAY BE BORNE IN AIR AND ON DEVICES APPLICABLE THEREIN

REFERENCE TO A RELATED APPLICATION

This is a continuation in part application of my co-pending patent application, Ser. No. 308,202 which was filed on Oct. 2nd, 1981, now U.S. Pat. No. 4,452,411.

BACKGROUND OF THE INVENTION

1. Field of the Invention

This invention relates to flying or floating craft and to devices which utilize a flowing fluid or movement of a body in fluid to create a rotation and/or lift or thrust.

2. Description of the Prior Art

Helicopters were commonly provided with an autorotation arrangemnent. However, the descending speed of the helicopter in autorotation is rather high. The "descent-speed slow down"-maneuver is a delicate procedure which often fails and the helicopter crashes. The trend in development of helicopters is presently to reduce the weights. Also the weights of the rotors becomes reduced. That reduces as a side effect the time of the landing maneuver in autorotation and thereby increases the change of failure of the landing maneuver, whereby the likeliness of a crash increases, when the engine of the helicopter fails.

In motor powered gliders it was custom in the former art to swing a motordriven propeller into and out of the craft, when a change-over from motorless gliding to powered gliding and vice versa was desired. The swing out of the propeller resulted in a negative influence on the flight path of the glider. The sudden appearance and disappearance of the drag of the propeller brought a negative influence on the speed and stability of the glider in the surrounding air.

SUMMARY OF THE INVENTION

It is the main object to overcome the problems and difficulties of the described former art and, in addition, to provide a fluid flow responsive thrust and/or rotation providing device.

Another object of the invention is to provide to a helicopter a capability to glide similar to a glider down to the earth under an angle of inclination relative to the ground when the power plant of the helicopter fails.

A further object of the invention is to provide variation of propellers and/or wings relatively to each other in order to improve the lift or the performance of the wings or of the propellers.

And another object of the invention is to provide an aircraft having a body with a longitudinal imaginary vertical medial plane through said body and a pair of first wing portions extending laterally from said body, one wing of said pair in one lateral direction of said plane and the other wing of said pair extending symmetrically in the opposite direction of said plane, wherein said wings of said pair include fluid lines to a pair of fluid motors which revolve propellers which are fastened to the rotors of said motors, wherein a second pair of secondary wings is provided in said craft, while one wing of said pair of secondary wings extends laterally of said medial plane and the other wing of said secondary wing extends from said body symmetrically in the opposite direction of said plane, wherein said secondary pair of wings includes fluid lines to secondary fluid motors which revolve secondary propellers which are fastened to the rotors of the motors of said secondary wing pair, wherein flexible means are included in said fluid lines, wherein said secondary wing pair includes flexibility arrangements to permit a change of the location or direction of said wings of said secondary pair, and wherein said secondary wings are variable in their position relative to said first wing pair in order to obtain suitable flight conditions of said craft at different speeds of forward movement of said craft.

Still a further object of the invention is to provide strong traction forces to the aircraft and to provide high lifting forces to a vertically taking off and landing craft by the provision on pluralities of propellers or propeller pairs on the craft. Because I have found that with equal installation and use of power the traction and lifting capabilities of aircraft and helicopters can be drasticly improved by the application of plural propellers or propeller pairs to the installed and available equal power. This feature is obtained by my following analysis of the technologies involved:

PARTIAL ANALYSIS OF THE TECHNOLOGIES INVOLVED IN THE INVENTION

At common aircraft-technology it was assumed, that it would be the most economic way to drive a propeller by mounting the propeller directly onto a flange of a crankshaft of the aircraft engine. By setting the propeller directly onto the crankshaft of the engine losses of transmissions should be prevented. Because, when a transmission is used between an engine and a means driven by the engine, there will be losses in the transmission.

This assumption of the common aircraft technology, which makes at the first glimpse the impression of being absolutely true—simply because it is true that a transmission has losses—is however, as the inventor of this application found, under certain circumstances a disastrous error, which has considerably prevented the advancement of flight-technology.

This will be visible at hand of FIG. 22 of this specification.

It is generally known from Newtons law of force, that the force equals the mass multiplied by the accelleration, according to equation: (1)

$$\text{Force} = \text{mass} \times \text{accelleration}; \text{ or: } F_k = m \cdot a \qquad (1)$$

The mass of air, which flows through the propeller circle of FIG. 1 is:

$$m = \rho \cdot F \cdot V_1 \qquad (2)$$

And, since it is required to accellerate the mass of air, when it flows through the propeller circle from the velocity "V0"=zero to the final velocity "V2", the accelleration of the mass of air, when it flows through the propeller-circle is:

$$a = V_2/\text{second} \qquad (3).$$

Consequently, the force obtained by Newton's $$F_k = \rho F V_1 V_2 / s \qquad (4)$$

And, since it is known from the theorem of Freude, that the velocity through the propeller circle is the mean value of the velocities before and after the propeller circle, namely:

$$V_1 = (V_0 + V_2)/2 \tag{5}$$

the force, which is required to keep an airborne craft with vertical propeller axis (axes) in hovering without ascend and descent is:

$$F_k = \rho F V_1 V_2 = \rho F V_1 2V_1 = \rho F 2V_1^2 \tag{6}$$

or, with I=impulse:

$$I = m2V_1 = 2\rho F V_1^2 = H = S \tag{7}$$

The kinetical energy in the air-stream behind the propeller is:

$$E_K = \frac{m}{2}(2V_1)^2 = 2\rho F V_1^3 = N. \tag{8}$$

Equation (2) can be transformed to V1, to be:

$$V_1 = \sqrt[3]{N/2\rho F} \tag{9}$$

and the "V1" of equation (3) can be used to be inserted into equation (1), whereby the followings are obtained:

$$H = S = 2\rho F [\sqrt[3]{N/2\rho F}]^2 \tag{10}$$

or:

$$H = S = 2\rho F \sqrt[3]{N/2\rho F} \sqrt[3]{N/2\rho F}$$

or:

$$H^3 = S^3 = 8\rho^3 F^3 \frac{N}{2\rho F} \frac{N}{2\rho F}$$

or:

$$H^3 = S^3 = \frac{8}{4}\rho F N^2$$

or:

$$H = S = \sqrt[3]{2\rho F N^2} \tag{11}$$

or:

$$N = \sqrt{S^3/2\rho F}. \tag{12}$$

In the above equations the following values may be used:

$\rho$ = density of air (for example: in kg s$^2$/m$^4$)
N×Power (for example in kgm/s)
S=H=lift of thrust (for example; in Kg.)
I=Impuls (for example in Kg.)
V1=velocity of the air in the propeller-circle (f.e. in m/s)
m=mass of air in the flow (for example Kgmass=Kg/9,81)
F=are of propeller-circle (for example in m$^2$.).

As a first step to explain my invention, I introduce "M" which shall define the number of propellers, which will be used in my craft. For comparison with conventional helicopters it should be understood, that equal diameters of propellers are considered. Also the forms, pitches, configurations and the like shall be the same, when propellers are compared.

As second step I introduce the efficiency of a transmission and call it "$\eta$". The transmission may also be my hydraulic transmission of a plurality of separated flows of fluid of equal rate of flow in the flows.

I now introduce "$\eta$" and "M" into equation (11) whereby equation (11) transforms to:

$$H = S = M \sqrt[3]{2\rho F \left(\frac{\eta N}{M}\right)^2}. \tag{13}$$

This equation (13) now shows already some very interesting surprises, which will be found to be important means of the present invention.

For example:

The equation explains, that the lift is as greater as the number "M" of the propellers is.

And, the equation has the further surprise, that the lift will not be reduced parallel to the losses in the transmission, but only with the third root of the second power of the efficiency-losses.

These features, which my equation explains, are obtained at the given power. Or, in other words, by equation shows, that, when a certain power is available, the lift or ability to carry, of an airborne craft will increase, when the number "M" of the propellers is increased and when done so, the losses which may appear in a transmission which transfers the power to the plurality of propellers will not reduce the lift or carrying capacity in the same ratio as the losses reduce the power in the transmission, but less, namely only with the third root of the second power.

In short, my equation shows, that with increasing the number of the propellers, an increase of lifting capacity or of carrying power, can be obtained.

As a next step to explain my invention, I assume, that in equation (13) equal values will be used for a comparison of a conventional helicopter with a plural propeller craft of my invention. Equal values in equation (13) mean, equal power "N", equal values "2"; equal values of density "$\rho$" and equal values of propeller-dimensions, including equal values of cross-sectional areas "F" through the propeller-circles. For a comparison of flight-technology-systems the equal values can simply be left out of equation (13) and I so obtain my comparison equation (14) which shows my comparison-factor "Ftl"; namely:

$$F_{TL} = M \sqrt[3]{\frac{\eta^2}{M^2}} \text{ or: } F_{TL} = \sqrt[3]{M\eta^2}. \tag{14}$$

With this equation it is possible to calculate a comparison diagram, wherefrom the comparison factor "Ftl" can immediately be seen and which shows, how many times lift a machine with a certain number of propellers and a certain transmission efficiency will give, compared to other or conventional craft. This diagram will be shown in FIG. 17.

The common helicopter has the Ftl value 1 minus the mechanic transmission losses and minus the power which is required to drive the tail rotor. In short, the common helicopter may have a Ftl value of 0.75 to 0.85.

Herebefore the thrusts, lift-forces, thrust-forces and power for the obtainment of certain forces have been calculated for the condition, that the propeller(s) does (do) not move in the direction of the axis (axes). In other words, the equations above are valid for propeller(s) in stand, but not for propeller(s) in movement in the direction of the axes of the propellers.

At the later to be discussed range of flight the craft moves substantially forward in levelled hight speed flight, where the resistance of the craft in air at the respective speed is in balance with the traction of the propeller(s). I call this range the "flight-range". Contrary thereto, the range where the propeller does not move, where the propeller is at stand or where the craft is hovering, in short, where the above discussed equations apply, we have an other range, which I call the "stand-range" or the "howering-range".

But, according to my "Handbook of my Flight-Technology" there is another range, a range between the stand-range and the flight-range. This range therebetween is called the "inter-thrust-range" in my handbook.

At this Inter-Thrust-Range the craft may permanently change its speed, for example, accelerate. The Inter-Thrust-Range can thereby also be assumed to be an acceleration-range.

At the said "Inter-Thrust-Range" the thrust of the propeller(s) is gradually decreasing when the velocity of the craft increases. The details of this situation and condition are exactly defined by my following equations for thrust of a propeller or of propellers in the inter-thrust-range:

$$S_i = 2N_{iN} \times \eta_G / \left( V_0 + \sqrt{V_0^2 + [\sqrt[3]{16\rho MFN^2}/\rho MF]} \right) = Kg_i \quad (15)$$

or:

$$S_i = 2N_{iN} \times \eta_G/(V_0 + \sqrt{V_0 + 2S_{ibm}/\rho MF}) = Kg. \quad (16)$$

The development of the above equations for the Inter-Thrust-Range can be seen in my "Handbook of my Flight-Technology". The first equation of the two equations, namely equation (15) is the more simple equation in actual calculation. The latter equation (16) is the more accurate equation, but it is more difficult and more time consuming in actual calculation procedure.

At the later "Flight-range" when the craft is flying substantially horizontally in levelled flight parallel to the surface on the earth, and, when the resistance of the aircraft during move in air is in balance with the traction force(s) of its propeller(s); or, in other words, when thrusts of the propeller equals resistance of the craft, but thrusts and resistance are opositionally directed, the following equation is valid:

$$W = (\rho/2) C_w A V_0^2 \quad (17)$$

and further, also the following equation will be applicable:

$$N = W \times V_0 \quad (18).$$

I now insert equation (11) into equation (12) and obtain:

$$N = (\rho/2) C_w A V_0^2 V_0 \quad (19);$$

which I transform to:

$$V_0 = \sqrt[3]{2N_{out}/\rho C_w A} \quad (20)$$

whereby I have a possibility to immediately calculate the expected velocity of an airborne craft or aircraft in its flight-range.

In the above flight-range equations, the following values may be used:
W=Resistance of craft in Kg.
$\rho$=Density of air, for example: 0.125 KgS$^2$/m$^4$ close to oceanlevel;
A=Projection of wings (airfoil) in m$^2$
Cw=Coefficient of resistance; dimensionless;
N=Power in Kgm/sec;
V0=Velocity of craft relative to air in m/sec..

Equation (14) can also be written in the following form:

$$V_0 = \sqrt[3]{\frac{1}{A}} \times \sqrt[3]{2N_{out}/\rho C_w} \quad (21)$$

The latter equation shows directly the influence of wing-area's vertical projection and also the influence of power and of the permanent values for the range of flight. For further defining the influence of power and the influence of the permanent values, the equation (21) may also be written as:

$$V_0 = \sqrt[3]{\frac{1}{A}} \times \sqrt[3]{2N_{out}} \times \sqrt[3]{\frac{1}{\rho C_w}} \quad (22)$$

and thereby all important influences for the speed which can be obtained in the flight range are directly visible.

With the above equations all conditions for vertical take off, for vertical landing, for the accellerations at the Inter-thrust-range and for actual horizontal levelled flight can be pre-determined and be exactly calculated in advance. The substantial correctness of the equations has been proven in actual testing in my research laboratory.

With these equations diagrams can be developed which show in detail and in advance which kind of craft are the most economical for take off and for flight.

From said equations and diagramms it can be found, that even, when hydrostatic transmissions of my hydraulic systems are arranged between a power plant, like an engine or a gas-turbine and a plurality of propellers, a substantially higher lifting capacity can be obtained than would be obtainable of the same power installation from a single propeller, if flanged onto the crank-shaft of the power plant. This is at least true for the vertical start or take off, for the substantially vertical landing and for flight with moderate forward speed. Only at a high forward speed will the single propeller per engine be of higher economy.

Consequently, it is more economical, according to this invention, to use a power plant to drive or create a plurality of separated fluid flows of substantially proportionate or equal rate of flow and drive thereby a plurality of propellers over fluid motors which are arranged at suitable locations on the craft. These theories are further condition to the fact, that at comparisons equal total power is installed and that the compared propellers have equal dimensions like equal diameters, sizes and pitches. The comparison can not be valid, if in the common craft other dimensions of propellers or power would be used, compared to those of the invention.

Therefore, according to the invention, an airborne craft may be driven by a plurality of propellers which are driven by hydraulic fluid motors, wherein the fluid motors are driven by separated fluid flows of equal rate of flow which are created in multi-flow pumps or hydrofluid conveying engines and wherein the pump(s) are driven or prime moved by a respective power plant or engine(s).

FIG. 4 shows an aircraft of the invention seen from the side.

FIG. 5 is a view to the craft of FIG. 4 from above.

FIG. 6 shows an aircraft of the invention seen from above.

FIG. 7 shows the craft of FIG. 6 from the front.

FIG. 8 shows the craft of FIG. 6 from the front in a modified condition.

FIG. 9 shows a portion of a propeller of the invention from above.

FIG. 10 shows an aircraft of the invention seen from above.

FIG. 11 shows another aircraft of the invention seen from above.

FIG. 12 is a sectional view through FIG. 11 along the arrowed line thereof.

FIG. 13 is a sectional view as in FIG. 12, however with modified parts.

Figure 20:
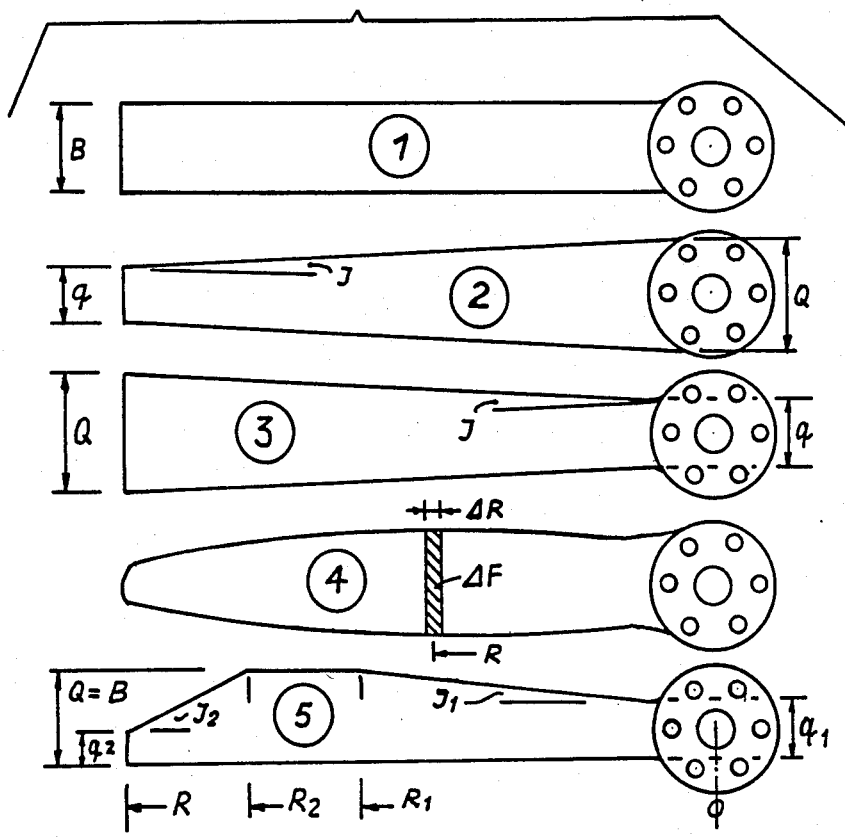

FIG. 20 demonstrates a mathematical analysis with formulas.

FIG. 21 demonstrates how the formulas of FIG. 52 were developed.

FIG. 22 demonstrates an analysis related to propellers.

FIG. 22 has Figure portions FIG. 22-A, FIG. 22-B; FIG. 22-C; FIG. 22-D and FIG. 22-E.

All Figures illustrate embodiments of the invention, schematic explanations or mathematical analyses of the respective embodiments of the invention. As far as Figures are mentioned by three digits with first digit 1 they define respective Figures of my earlier patent application Ser. No. 064,248 and as far as the first digit is 2 they define respective Figures of my earlier patent application Ser. No. 184,687. These earlier applications are now abandoned.

DESCRIPTION OF THE PREFERRED EMBODIMENTS

Figure 1:
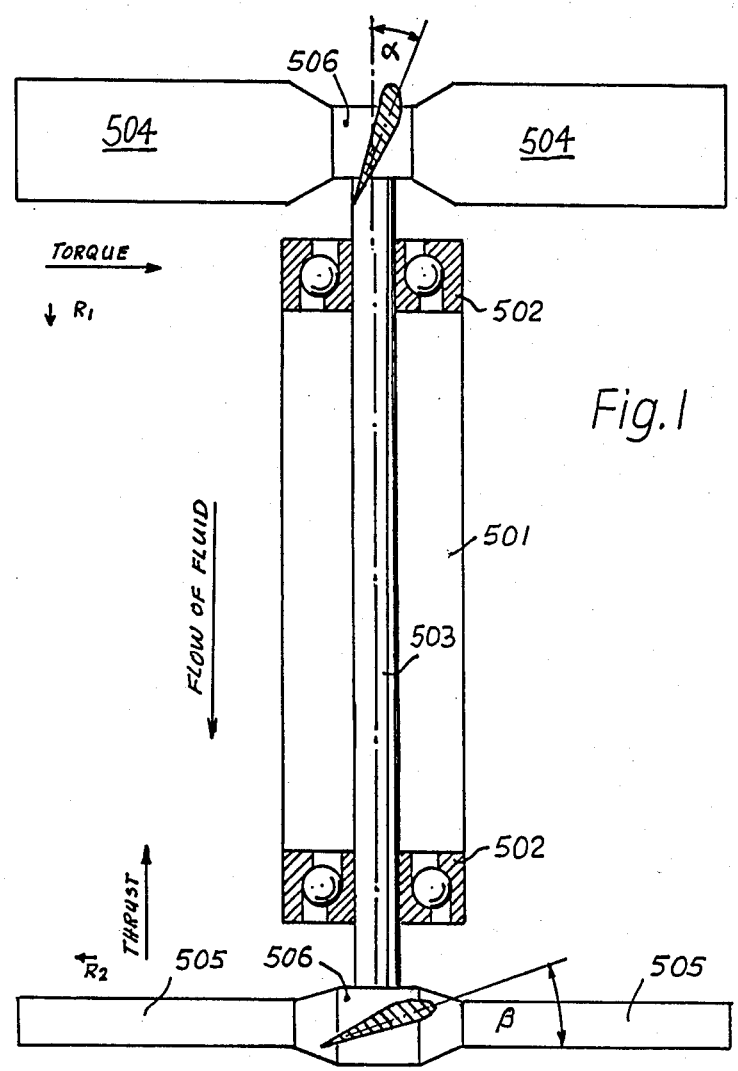
FIG. 1 is a longitudinal sectional view through a unit of the invention.

FIG. 1 demonstrates a thrust unit which has a body 501 with bearings 502. A shaft 503 is revolvingly borne in the bearings 502 and the bearings 502 are capable of carrying a thrust in one of the axial directions. Shaft 503 holds a front propeller 504 and a rear propeller 505, to revolve the propellers in unison when the shaft 503 revolves. The front propellers 504 have angle of attack "alpha" while the rear propellers have angle of attack "beta". Note, that the bases for the angles of attack are 90 degrees turned between the front and rear propeller. When a fluid streams from top of the figure towards the front propeller 504 or when the entire unit moves upwards in a resting fluid, the relative fluid stream, which might also be a water stream or an air stream, moves downwards in the figure, relative to the front propeller 504. The angle of attack alpha then provides a rotation of the front propeller and thereby also of the shaft and of the rear propeller in the direction to the right in the Figure. The angle of attack beta then creates a thrust in the direction of the arrow with the word "thrust", which is a thrust in the direction upwards in the Figure. The direction of thrust is thereby contrary to the direction of the fluid stream or of the arrow with the word "Flow of fluid".

The feature of this arrangement of FIG. 1 is, that a thrust can become obtained, which may be directed contrary to the movement direction of the driving fluid stream. For example, the front propeller may be set into the wind and the rear propeller may be set into the water behind a boat. The boat will then be able to run against the wind. The entire unit may also be set into the wind and it will then give a thrust against the wind. For example, the unit may also be mounted onto an aircraft and the forward flight speed of the aircraft may then be utilized to obtain a thrust of a local place on the aircraft in the direction forward. The propeller pitches may be fixed or variable. When they are variable, the angles "alpha" and or "beta" may be variable. The thrust will increase with the increase of the flow of fluid, for example, with the forward speed of the aircraft.

With variable pitch propellers the size of the thrust can be varied. The unit may be used also, to incline wings, propellers or other members on the aircraft in dependency on the forward speed of the aircraft. It may also be utilized to obtain and maintain a rotary movement, when the unit moves relatively to the air or when a fluid flow moves along the unit in the direction substantially parallel to the axis of shaft 503.

Figure 2:
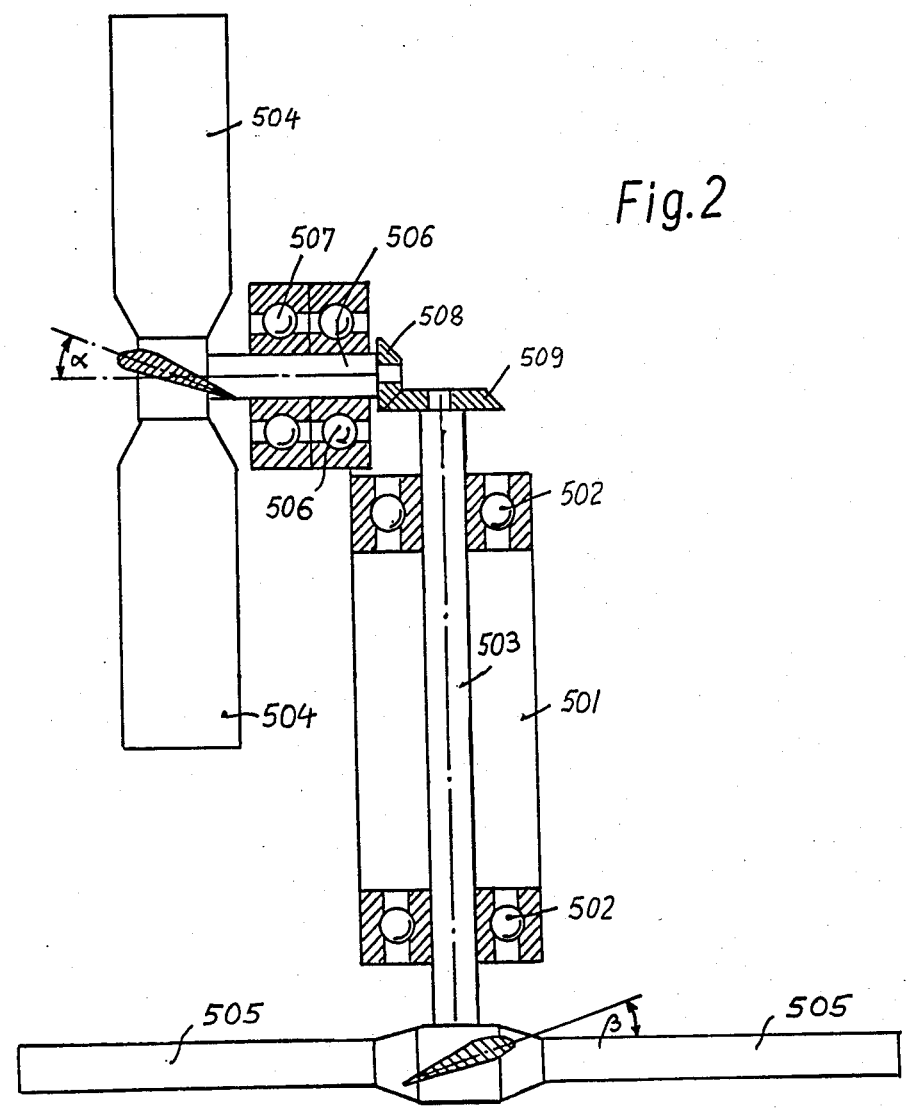
FIG. 2 is a longitudinal sectional view through another unit.

FIG. 2 demonstrates a modification of the unit of FIG. 1. It has in addition to the parts of FIG. 1 a second shaft 506 revolvably borne in further bearings 507 and an angular gear 508, 509 between the first shaft 503 and the second shaft 506. In the figure the preferred arrangement is demonstrated wherein the first and second axes 503 and 506 are normally directed relatively to each other. The angular gear 508,509 revolves the first shaft 503, when the second shaft 506 revolves.

The practical application of this figure is that a fluid flow relatively along the second axis will provide an upwards directed thrust. For example, when it is mounted on a forward moving air craft, the forward movement will provide an airflow along the axis of the second shaft 506 and with the angle of attack alpha revolve the front propeller 504. Gears 508,509 will transfer the revolution of shaft 506 to shaft 503 and thereby revolve the rear propeller 505. The rear propeller will then by the angle of attack beta give an upwards directed thrust. In suitable arrangements, the thrust of propeller 505 may carry the air craft, whereby wings may be spared on the air craft. As will be seen at the later discussion of FIGS. 4 and 5, the unit can be used to transform a multibladed helicopter into a glider, whereby a helicopter can continue to fly as a glider, when the engines to drive the rotors fail.

Figure 3:
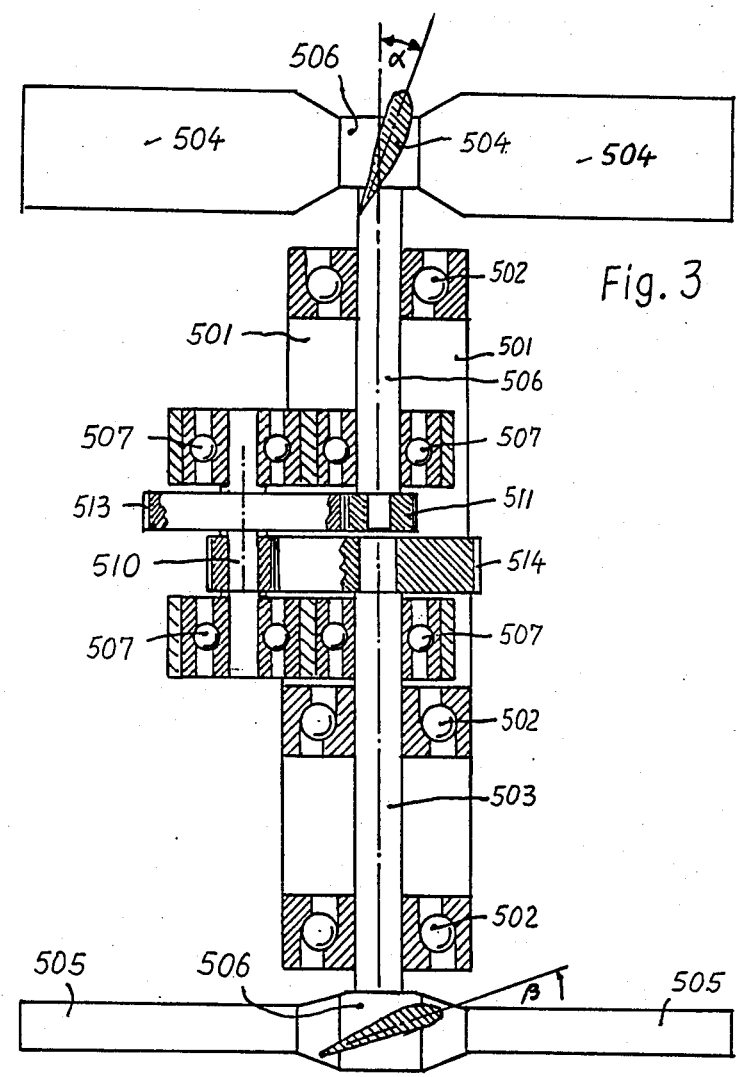
FIG. 3 is a longitudinal sectional view through still a further unit.

FIG. 3 shows, that a speed-up or a speed-down gear may be provided between the front propeller and the rear propeller. In the same way, the angular gear 508,509 of FIG. 2 may be a speed-up or a speed-down gear and the gear arrangement of igure 3 may also be provided in FIG. 2. Additional bearings 7 serve to bear portions of shafts 506 and 503 or to bear a third shaft 510. The gears 511 to 514 are provided on shafts 503,506,510 to form the described speed-up or speed-down gear. With the gear means between the front propeller 504 and the rear propeller 505 any desired ration of relative speed of propeller 505 relative to propeller 504 may be obtained.

FIG. 4 demonstrates together with FIG. 5 a multibladed helicoper with plural rotors. Such helicopters with multirotors are generally known. They are, however, assumed to achieve by the pilot's control action, an auto-rotation of the rotors, when the engine fails to drive the rotors. The autorotation should then effect an emergency landing. Occasionally, however, the emergency landing becomes a failure and the helicopter crashes. That occurs because the autorotation must be utilized to effect a change of angle of attack of the propeller blades shortly before the craft reaches the ground. If the height is misjudged, the craft may not obtain the desired break of the speed of descent and may fall with too much speed against the ground. This matter is more dangerous in the present time, as the propellers are becoming lighter and thereby of less mass. The lower mass of the newer rotor blades reduces the moment of inertia of the blades and thereby reduces the number of revolutions, which with the rotation flare out maneuver". Therefore, the time duration for the emergency landing maneuver is reduced with newer propellers of lower masses relative to the propellers with heavier masses of the past.

The emergency landing maneuver in autorotation of the past and present is, therefore, no longer the ideal solution for an emergency landing. The invention, therefore, provides a novel kind of emergency landing for a helicopter. This novel system of the invention is, not to land in auto-rotation with descent-speed break maneuver close to the ground, but to transform the helicopter into a glider, when the engine(s) fail(s) to drive the rotor(s) of the helicopter.

While FIGS. 4 and 5 demonstrate one of the methods of the invention to transform a helicopter into a glider, FIGS. 28 to 44 show related systems with other means, than in FIGS. 4 and 5, to provide a glider-performance to the helicopter.

The helicopter of FIGS. 4 and 5 has multiple rotors 15 to 22 with substantial vertical axes to carry the craft including its body 1 which may have the power plants and passenger cabin or other compartments, fuel tanks, etc. Each rotor is borne by a shaft with a free-wheeling arrangement 25. Some rotors, for example, 15 to 18 may further in addition to the free-wheeling arrangements 24 have revolution-drive arrangements, for example, fluid motors 25 to revolve the rotors 15 to 18 over the fluid motors by the power plant.

Each free-wheeling arrangement 24 and thereby the respective bearing rotor 19 to 22 is held by a holder 23. In addition to the rotors with the substantial vertical axes, the craft is provided with at least one propeller 28,29 with a substantial horizontal axis. In the FIGS. 4 and 5, the craft has two or more such propellers 28,29. The propellers with the substantially horizontal axes are driving propellers, while the propellers with the substantial vertical axes are the carrying propellers, or the bearing propellers. The bearing propellers are bearing the craft in the air, while the driving propeller may be utilized to drive the vehicle forward in the air.

The driving propellers may, therefore, also have drive-arrangements; for example, fluid motors 27, to revolve the propellers. The driving arrangements of the bearing propellers and of the driving propellers may be actuated and be driven by the main power plant, for example in body 1, by a transmission means for example by a fluid pump and fluid lines, when the drive arrangements include fluid motors to drive the respective propellers.

The drive means to drive the driving propellers are, however, not in all cases required. Required is to each driving propeller 28,29 however a transmission means and/or free wheeling means, 26,8,9,29 to 32. The transmission means transfers the rotary movement of the propellers 28 and/or 29 to one or more of the propellers 19 to 22. This can be done, for example, by the arrangement of FIG. 2 or any other suitable solution.

Considering now that the craft is flying with the foward movement parallel to the horizon(-as shown by the arrow between the figures-)under power of the power plant, when at least propellers 15 to 18 are driven and revolved by the power plant over the respective tramsmission means, which might include the fluid motors 25.

When then suddenly the power plant or all of the power plants fail(s) or a fluid line breakes, the pilot will incline immediately his craft slightly downwards with the front portion, as shown in FIG. 4. The craft still has the full forward directed flight speed.

The flight speed will then drive the drive propeller(s) 28, 29 as demonstrated in FIG. 4. The free-wheeling arrangement will overrun the connection to the fluid motor or first transmission.

The forward speed of the craft will create the fluid flow of FIG. 1 along the propeller 4 of FIG. 2 and thereby along the axes of propellers 28 and 29. The transmission of FIG. 2, which might split into plural exits to plural propellers, will now drive the bearing propellers 19 to 22 or a plurality thereof. Similarly as propeller 4 drives propeller 5 in FIG. 2.

The high speed forward movement of the craft will provide a strong torque on the propellers 28,29 which is strong enough to drive the propellers 19 to 22. It should be noted, that propeller(s) 28,29 may have a great angle of attack, while the bearing propellers 15 to 22 may have only very small angles of attack. The drag of the bearing propellers 15 to 22 is thereby small, while the thrust or lift of the blades of propeller(s) 28,29 is very high, because of the great angle of attack and because of the high forward speed of the craft. At this moment the craft has no downward or upwardly directed speed, because it flew horizontally, when the power plant failed. The gravity, however, acts on the weight of the craft and starts to pull the craft downwardly to the ground. The craft thereby obtains the direction of movement as shown by the arrow between the drawings. This direction of movement after the engine failure is directed strongly forward and slightly downwardly, such as a glider. The gravity pulls the craft downward, but since the forward speed drives the propeller(s) 28,29 and the said propeller(s) 28,29 thereby drive, as shown in FIG. 2, the bearing propellers 15 to 22 with the vertical axes, the bearing propellers 15 to 22 are continuing to bear the craft. However, under loss of some height, because the craft now moves in the slightly downwardly inclined direction of the arrow of movement. The direction of movement maintains itself under the force of the gravity. Thereby the foreward movement is maintained and the bearing capacity is maintained; —however, under loss of some height.

Thus, the arrangement of FIGS. 4 and 5 provides a multi bladed helicopter, which does not require on autorotation descent speed break maneuver, but which flies on as a glider under loss of some height but under maintainance of the forward speed. Even, the forward speed may slow down slightly, the craft glides, but does not fall downwards. The pilot might look for a suitable landing place on the ground to land on wheels or on slides, for example, as an aircraft or as a glider. The arrangement of these Figures, therefore, provides an effective emergency landing means.

The free-wheeling arrangements 25 make sure that the change from power plant operated flight to emergency gliding flight appears automatically without adjustment by the pilot. However, when the pilot hears that the power plant has stopped or otherwise becomes aware of the failure of the power plant drive of his craft, he should actuate a shift of the gravity center of his craft to incline the craft slightly downwards forwardly, to obtain an optimum of the gliding angle. A gravity center shifting deivce 30 may be respectively provided in the craft. The pilot may control his gliding flight to the emergency landing place by the gravity shifting device 30 to incline his direction of movement sharper or softer relative to the horizon and by the actuation or control of his side rudder 2 for yaw axis control.

FIGS. 6 to 8 demonstrate a motorglider of the invention. In common motorgliders with retractable propellers it was custom to swing a single propeller out of body 1 of the craft. Mostly that is done upwards. This common system to swing the propeller out and into the body of the glider has, however, certain disadvantages. For example, the center of thrust of the propeller is not in the axis of the drag of the craft. Thereby the sudden "swing-out" of the propeller provides a sudden off center drag and influences negatively the flight path and stability of the flight of the glider. The sudden start of the propeller provides a second sudden negative influence in the flight of the glider. Both influences appear suddenly and they are demanding a piloting skill from the pilot to prevent a crash of the glider under off centered sudden drag or thrust.

The invention, therefore, provides in FIGS. 6 to 8 a glider arrangement of the invention, which drastically reduces the negative effects of the swing motors of the common motorgliders. The invention provides at least one pair of propellers 9,10 arranged symmetrically relative to a medial longitudinal vertical imaginary plane through the body 1 of the motor glider. The propellers 9, 10, of the propeller pair are held on holder arrangements 8 and are driven by a drive means 7. I prefer to use fluid line pipes as holders 8 and to use fluid motors as drive means 7. The fluid motors are then driven by a double flow pump, while the pump is driven by an engine. Engine and pump can be located and remain at all times in body 1 of the motor glider.

Thereby the first feature of this embodiment of the invention appears, and is, that not the entire engine is swung in and out of the body, but only the propeller with the rather small and light fluid motor(s) 7.

The second feature of the invention is that both propellers 9 and 10 are swung out symmetrically and in unison. That is seen in FIG. 6. Therein the fluid motors 7, the holders, fluid lines, 8 and the propellers 9,10 are shown in the position, where they are located in the body 1. That is the first position of location of the propellers.

Thereafter the propellers are schematically demonstrated in the second position of location by 13 and there the third feature of the motor glider of this embodiment of the invention becomes apparent. It is that at this second position 13 the propellers can start to revolve, and that at this position only a small drag is added to the glider. The drag is added symmetrically of the body of the craft and thereby sums up to a drag in the center line of the craft. And, in addition, the thrust now acting rearwardly is only small, and corresponds to the reaction force to arrow 15 of FIG. 6. The rest of the thrust of the propeller is directed along arrows 16 towards the body of the craft. Thereby only portion 15 of total thrust 14 is in this second position 13 of the propellers acting forwardly on the body 1. Or, in other words, at position 13 the motor glider obtains smoothly a slight forward thrust and the thrust is acting substantially along the medial center line of the body of the craft. Any lateral influence on the flight path of the glider of the invention is prevented.

The next position is the third position and location 11. The thrust in forward direction is now increased and obtains now about 71 percent of the entire thrust. Again, the thrusts sum up to a combined thrust in the longitudinal axis of body 1.

The fourth position and location of the propellers is shown by their positions 9 and 10, when the blades of the propeller are substantially parallel to the wings 2 of the glider. At this position and location the entire thrust of the propellers 9 and 10 is now acting forwardly on body 1 of the glider. The holders 8 are partially shown in this position in FIG. 6 and the drive means or fluid motors 7 are fully shown in this fourth location and position of the propeller pair 9, 10.

While four locations have been shown, namely those of the location in the body, swung out 45 degrees, swung out 60 degrees and swung out 90 degrees, it should be noted that the swinging out can be done steplessly. A very smooth build up of the thrust is then obtained. And any lateral disturbances of flight are prevented. The arrangement of this embodiment of the invention, therefore, acts very smoothly and is very convenient in handling. At the same time it prevents all sudden lateral drags and thrusts and disturbances of the flight path of the vehicle.

The "swing-out" and the "swing-in" may be done around the swing bars in switch bearings 3 and 4. If fluid motors 7 are used to drive the propellers 9,10, respective fluid lines may extend through or along swing means 3,4 and the fluid may flow through holding pipes 8. Otherwise a transmission portion will be extended through or along swing means 3,4 and through or along the holders 8 to the drive means 7 of the propellers 9,10. Flexible transmission means or flexible fluid pressure hoses may be set between the engine or pump and the swing means 3, 4. A device may be added to swing the holders 8 around the swing means 3 and 4 respectively and in unison.

An additional feature of the invention may be provided as demonstrated in FIGS. 7 and 8. Therein the glider is shown from the front and shows the propellers 9,10 in FIG. 6 in the flight position, but in FIG. 7 in the take off or landing position. In the flight position of FIG. 6 the propellers 9,10 are substantially behind or before the center line of the sum of drags of the body 1 and of the wings 2. Thereby any lateral disturbing thrust or drag is fully prevented. The location of the propellers is now ideal as in a common aircraft. When, however, at start or landing the tips of the revolving propellers would be too close to the ground, it is better to swing the propellers slightly upwards. The centers of thrust of the propellers are then above the center line of drag of the craft. But, since the swing-up can be handled steplessly, a respective control action by the elevators can smoothly and in unison with the swing-up operation keep the craft in a straight flight path. FIGS. 6 and 7 therefore demonstrate second swing arrangements 5 and 6 which are preferredly normally arranged respective to the first swing members 3 and 4. For example the swing members 5,6 may be mounted on swing members 3,4 or vice versa.

The arrows in FIG. 6 as far as they are within body 1, demonstrate the action of swing of means 3,4 and the arrows in FIG. 7 demonstrate the action of swing of swing means 5 and 6.

With these arrangements of the invention, a superior motor-glider is obtained. The arrangement can be a complete built-in unit to be assembled to existing gliders. It can also be used in common aircraft. For example, to provide additional propellers for take off.

FIG. 9 demonstrates an improved propeller of the invention. It has one first propeller body 4 with a second propeller body 5 axially guided and extendable in the first propeller body 4 and a third propeller body 6 axially guided in and extendable in the second propeller body 5. The figure shows the propeller bodies in the most outwardly extended positions and locations. The other extreme position is that the third and second propeller bodies are fully retracted into the first propeller body 4. The propeller body 4 may be provided in a revolving disc 3 or laterally distanced from the drive motor 1 with shaft 2, if so desired. Such arrangement makes especially large differences between the smallest and biggest extensions of the propeller portions possible, and a second propeller set 16 may then be provided diametrically opposite relative to the propeller holding and driving shaft 2. The end plates 7,8 are serving to direct the flow along the tips of the propeller bodies and also to arrest the second and third propeller bodies in the innermost positions.

To control the locations of the propeller bodies either in their outermost or innermost positions or in any other position steplessly therebetween, the following arrangement is preferred in accordance with the present invention:

A fluid line extends from a pressure supply device along or through holding- and drive-shaft 2, wherefrom the fluid line(s) 13 extend into or along first propeller body 4. A fluid line 14 extends along or through body 4 into the radially outer portion of the second propeller body 5 and into a cylinder 10 which is arranged in the second propeller body 5. The first mentioned fluid line 13 extends into the radial outer portion of a cylinder 9 which is arranged in the first propeller body 4. A valve—not shown in the Figure—is provided to permit the opening of the fluid line which leads to fluid line 13. When now the propeller(s) which might include the medial disc 3, revolves, the second and third propeller bodies 5 and 6 are moving outwardly to their radial outermost position and location under the centrifigal force of the weights of the mentioned bodies. The propeller bodies are obtaining the positions which are shown in the drawing of FIG. 9. The propeller now provides the highest possible thrust at a given revolution per unit of time. These positions of the propeller bodies are especially suitable as helicopter propellers for vertical take off, landing or for hovering.

When the aircraft has obtained a forward speed, the large diameter propellers of the demonstration in FIG. 9 may become uneconomic or may provide too large a drag. It is then preferred to retract the propeller arrangement to a smaller outer diameter or to shorter propeller arms. The second and third propeller bodies are then partially steplessly or entirely subtracted into propeller body 4. The retraction into the first propeller body 4 may be done by mechanical transmission means. I, however, commonly prefer the hydrostatic retraction device, which is illustrated in the Figure, because this device is specifically safe in operation, easy in handling and it can be provided easily for the operation of plural propeller arrangements in unison. In such case a fluid is led through the fluid lines into the mentioned cylinders 9 and 10, wherein pistons 11 and 12 are reciprocable. Since the fluid lines 14 and 15 enter the outer portions of the cylinders 9 and 10, they are entering radially outwardly of the fiiting heads of the pistons 11 and 12. Any quantity of fluid which is led through the fluid lines 13, 14,15 into the cylinders 9 or 10 therefore drives the pistons 11,12 in their cylinders 9,10 radially inwards and thereby retracts the second and third propeller bodies 5 or 6 into the respective propeller body 4 or 5. The quantity of fluid pressed into the cylinders decides how far the respective propeller body shall become retracted. Since the fluid pressure must act against the centrifugal force of the respective propeller body, the pressure in fluid will decide which propeller body retracts how deeply into the respective other propeller body.

It will be easily understood, that the play of forces which act by centrifugal weight and by fluid pressure, a number of different propeller assemblies; for example, as in FIGS. 6, 9 or others, can be handled from a single fluid pressure supply device in a fluid borne craft to retract and move out in unison.

While first, second and third propeller bodies 4,5 and 6 have been shown in the figure, it may be possible, if size and strength permit, that other numbers of bodies may be applied, depending on design, requirements and strengths, for example, a first and a second propeller body or even a first, a second, a third, a fourth and a fifth propeller body or more propeller bodies. In FIG. 9 the diameter of the propeller circle is variable almost 3 to 1. That defines a variable circle area of $3^2$ or 9 to 1 for the propeller circle. The lift of the propeller in outermost extended location, as in FIG. 9, will thereby be roughly two times higher at equal power consumption and revolution, than in the innermost retracted position of the propeller bodies, when the propeller is used in stand or for hovering of a helicopter. In the retracted position, which is the innermost location of the propeller bodies, the propeller will have little drag or no drag, when retracted into the disc 3. The arrangement is then suitable for higher speed forward flight.

Thus, the invention of this embodiment provides a steplessly variable diameter of a propeller arrangement, suitable for aircraft and high-speed flight as well as for vertical take off aircraft or helicopters.

The consequences of the arrangement of the invention will be better understood at hand of the application in a craft of practical use which is demonstrated in FIG. 10.

In FIG. 10 a vertical take off and landing aircraft of the invention is demonstrated, which can also fly forward as an aircraft with forward speed. It may also land or start as a common aircraft, if so desired. The feature of this embodiment of the invention is that the aircraft can, in flight, transform from a helicopter-like craft to an aircraft-like craft. Due to another feature of the invention, it can transform steplessly from vertical craft like a helicopter to a horizontal moving craft, like an aircraft, and vice versa. In addition, another feature is that it can carry relatively heavy loads vertically off at vertical start and down at vertical landing. And, still a further feature is that it can do its actions with good economy and with relatively small and light engines or power plants with limited power and fuel consumption.

In FIG. 10 the craft has a body 1 which may contain the passenger and/or freight compartment, the pilot's cabin (or cockpit) and the power plant. If the craft is operated hydrostatically or hydraulically, the body 1 may also contain the respective pump(s) connected to the respective power plant(s). Laterally from body 1 the wings 2 extend. A propeller 9 is driven by shaft 8 and has a substantially horizontal axis to drive the craft in the forward flight as an aircraft, borne on wings 2. Instead of one forward driving propeller 8, there may be a plurality of such propellers provided. This propeller(s) is(may) be driven by a separated power plant or be driven hydraulically from the main or common engine or power plant or power plant set in body 1. Elevators 10 and side rudder 11 are provided as usual to control the flight path and location of the craft during movement in the air.

According to the invention, the wings 2 may be substantially formed as the arms of the propellers of FIG. 9. For example, the wings 2 may be formed similar as the first body 4 of FIG. 9. The second bodies 555 may be retractable into the first bodies 222 of the wings 2. The third bodies 666 may be retractable into the second bodies 555 as it was handled in FIG. 9. Thereby, the second and third bodies 555 and 666 may be entirely or steplessly fully extended radially from first wing bodies 2 and thereby laterally of body 1 of the craft into the autermost position or be retracted steplessly into the innermost position. In the innermost position the second and third bodies 555 and 666 are fully retracted into the first wing bodies 222.

The feature of this arrangement is that the craft can start, land and fly at lower speeds with the wing bodie 555,666 fully extended to the outermost position, while it can also fly at high forward speeds with little drag when the second and third wing portions 555,666 are fully retracted to the innermost position. Any position and action therebetween is possible, when the arrangement is done steplessly, as in FIG. 9. Since the wing bodies 555 and 666 have no centrifugal force, the outward movement of them may be handled by spring means or by hydraulic means by replacing the one way pistons and cylinders of FIG. 9 by double way acting pistons and cylinders with a respective number of fluid lines and controls. When no variable wings, 222,555,666 are required, simple, fixed wings 2 may be used.

For vertical take off and landing, for hovering in air, or also for relatively low speed forward flight, breaking in the air of backward or sidewards flight, the craft is provided with at least one propeller 5. I prefer to use at least one propeller pair or a plurality of propeller pairs and I prefer to drive the rotation of the propellers hydraulically. In FIG. 10 two pairs of propellers are shown and the propellers are corresponding in this example to the propellers of FIG. 9. One sees in FIG. 10 four propeller holding shafts 7 with discs 3 of FIG. 9. Each propeller disc 3 contains the first propeller bodies therein and the Figure shows the second and third propeller bodies 5 and 6 extended to their outermost positions. At this location of the propeller pairs, the hydraulic motors which drive the propellers and the fluid lines which are forming the holding structures to hold and drive with the fluid which flows through the revolutions of the propellers are not visible. Because the sizes of the structure and of the fluid motors are typically smaller than the sizes of the propellers and of their holding discs 3.

In this arrangement of all propeller bodies in the outermost position, the craft obtains a very high load capacity for vertical take off, landing and hovering, as well as for forward flight with limited speed. As explained at hand of FIG. 9, the lifting capacity in outermost position of all propeller bodies is about double of that of first propeller bodies only when the same power is used to drive the lift and bearing propellers 3,5,6. For such applications, where the arrangement of FIG. 9 of the propellers is too expensive, simple propellers may be used and the discs 3 may also be spaced, if so desired. That, however, works at the expense of the extensive utility of the craft.

When the craft obtains a certain forward flight speed under propeller(s) 9 or other propulsion means, the second and third propeller bodies 5 and 6 of first propeller bodies or discs 3 may become gradually retracted in relationship and depending on the rate of forward speed, until finally the second and third propeller bodies 5 and 6 will be entirely retracted into the first propeller bodies or discs 3. This will be accomplished fully, when the craft has obtained a respectively higher forward speed. At this time of second and third propeller bodies 5,6 completely retracted into their innermost position, the discs of first propeller bodies may act as small lifting bodies would act and may help to carry the craft.

With still further advancing forward speed the front propeller sets 3,5,6,7 will be swung forward until they are moved at least partially into the body 1 of the craft. The rear propeller sets 3,7,5,6 will be swung backward until they are at least partially located within body 1 of the craft. The swinging into the body 1 will be done, for example, as in FIG. 6. The propeller sets 3,5,6,7 may either be swung entirely into body 1 as done in FIG. 6 or they may be swung partially into body 1. A preferred solution of swinging them partially into body is demonstrated in FIG. 10 by the location of the discs 3 partially in the body 1. In this location the discs 3 are cited by the referentials 3—3. The discs 3—3 are now forming small wings and may be used to help to carry the craft at very high forward speed or to help to assist the stability of the craft at speedy forward flight. The craft now has wings 222,555,666 and the pairs of front and rear wings 3—3.

For still higher forward speeds with less drag area, the third wing bodies 666 may be retracted. Thereafter for still higher forward speeds the second wings 555 may become retracted. Or, the second and third wings 555,666 are retracted partially and in common as in FIG. 9 the second and third propeller bodies 5 and 6 are retracted. Finally the second and third wing bodies 555 and 666 may be entirely retracted into the first wing bodies 2 for very high speed forward flight. For still higher speed forward flight, the part wing pairs 3—3 may be further retracted into body 1 and at highest forward speed the wing pairs 3—3 may be entirely retracted into the body 1.

When the craft nears the destination, the respective portions may become gradually extended. For example, the wingpairs to 3—3, thereafter the second and third wing bodies 555,666. And finally, for the landing also the propeller pairs 3,5,6,7 will be extended to the outermost positions as seen in FIG. 10 for the vertical landing on a small field or place of destination. When the destination, however, is an airport with a runway, the extension of the propeller sets 3,5,6,7 may not be required or may be done only partially.

The craft of the invention of FIG. 10 is therefore able to fulfill a great number of duties. For example, vertical take off and landing, hovering, and also medial and high or very high forward speed flight.

In FIGS. 11 to 13 another embodiment of an aircraft of the invention is demonstrated. It serves for a shorter runway of take off and landing. It may also make an aircraft capable of an immediate "inclined-angle" take off and landing without a runway.

The embodiment of the invention obtains its capability and aim by the provision of a pivotable and retractable assistance-wing set. For example, of each one or more retractable wing(s) at the left and right of the body 1 of the craft.

In FIGS. 11 to 13 again the body 1 may contain the passenger and/or freight compartments, the power plants, and if provided, also the hydraulic pumps, plus at least the pilot's cabin or cockpit 10. Laterally from body 1 are the wings 2 extended, whereof the left one is only partially shown in the FIG. 11. Wing(s) 2 may be provided with propeller(s) 5 and with drive-means 4 to drive the revolving motions of these (this) propeller(s).

According to this embodiment of the invention, however, a pair of assistance wings 3—3 with additional drive means 6 to revolve the propeller(s) and additional propeller(s) 7 is provided. I prefer to locate the assistance wings 3—3 behind the main wings 2 and I also prefer to incline them to a steeper angle of attack. For example, to 30 degrees, 45 degrees or even to 60 degrees, or to any other suitable angle of attack. Since the assistance wings 3—3 have propellers with axes substantially equal to the medial line through the chord of the respective assistance wing or only slightly inclined relatively thereto, the assistance propellers 7 of the assistance wings are helping to draw a flow of fluid over the main wings 2. That prevents stalling of the main wings 2 at least partially and it also assures a flow of air over the assistance wings 3—3 without stalling of the wings. Even if the stalling may not be entirely excluded, it at least reduces the possibility of stalling very drastically when the arrangement of the invention is applied.

The assistance wings 3—3 with the assistance propeller(s) 7 will help the craft to get airborne after a shorter runway length and with smaller speed. It may even provide an immediate inclined take off and landing without any considerable runway. The effect on the runway and take off and landing possibilities will depend on the size of the assistance wings, on their angles of attack, on their location relative to the main wings 2, on the size and revolutions of the assistance propeller(s) 7 in addition to the sizes of the main wings 2 and main propellers 5 as well as on the speeds of the main propeller(s) 5.

Once the aircraft of this embodiment of the invention has taken off and obtained a certain forward flight speed, it is convenient to reduce the drag and power consumption of the craft in order to obtain a still higher forward speed. Therefore, the assistance wings of the invention are provided with a "swing-in" and "swing-out" capability. The assistance wings 3,3—3 may gradually and steplessly or immediately completely be swung into the body 1. For example, as the propellers of FIG. 6 are swung into the body 1. Any location between full extension and full retraction into the body may be used for partial utilization of the thrust of the assistance propeller(s) 7 and of the lift of the assistance wing(s) 3,3—3. For example, substantially similar as it is the case with the retractable propeller(s) of FIG. 6.

In FIG. 11 the assistance wings are also shown in the innermost retracted position. At this position they are cited with the referential 3. In the outcut of FIG. 11 one sees the fully retracted right side assistance wing 3 once in the innermost retracted position with referential number 3 and also the innermost retracted position of the left side assistance wing, also with referential 3. Also shown in FIG. 11 by dotted lines is the outermost extended position of the right side assistance wing with referential 3—3, which demonstrates the outermost position of the right side assistance wing 3. The outermost location of the left side assistance wing 3,3—3 is not shown in the Figure, because there is no space for it on the paper and also it is easily understood without writing it into the Figure, because it is symmetrically to the wing 3—3 of the right side of the craft, respectively to the medial vertical longitudinal imaginary plane of body 1.

For making the "swing-in" and "swing-out" possible, the body 1 is provided with respective swing bars 11, bearings 8 therefore and holding arrangements 9 therefore. For the right side assistance wing as well as for the left side assistance wing 3,3—3. The swing out may be effected mechanically, if so desired. I, however, prefer to use hydraulic equipment to drive and accomplish the swing in and swing out-operations. For example, hydraulic motors, pistons, cylinders swings or the like to be operated by fluid pressure and to be controlled by valves or flow quantity controller or pressure controllers respectively.

The FIGS. 12 and 13 are sectional Figures taken along the arrow-line in FIG. 11. They demonstrate that a single swing bar 11, supported in a pair of bearings 8, is enough to hold and guide the assistance wings 3,3—3 in all of their positions including in the innermost retracated and outermost extended positions. FIG. 12 shows the assistance wings with 45 degrees inclination relative to the forward flight movement and FIG. 13 demonstrates the inclination of 60 degrees of the assistance wings 3,3—3 relative to the forward movement direction of the craft. The figures are showing that at these angles of the wings, they have adequate space in the body to be retracted into body 1. While the holding bars and swing bars 11 are shown vertically extended in the craft, it would also be possible to provide them in an inclination in bearings 8 in order to effect other angles of attack of the assistance wings. Also a combination of swing arrangements, as in FIGS. 6 to 8, is possible in order to change the angles of inclinations of the wings accordingly.

The arrangement of this embodiment of the invention provides a very effective assistance to the aircraft for short take off and landing or even for inclined angle take off and landing as well as for low landing and take off speeds or for carrying of higher loads. And the arrangement obtains these features by a most simple construction, design and cost at low weight.

The actual design and building of the craft of this embodiment is rather easy and reliable, when my fluid motors and fluid pumps are used to drive the propeller(s) 7. Flexible hoses can easily be set from the pump to the swing arrangement. The wings 3,3—3 may be built around a fluid pipe structure to the motors, as for example illustrated in FIGS. 20 to 22. Also the main wings 2, motors 4 and propellers 5 may be of similar construction or also be hydraulically driven and operated.

FIGS. 14 to 19 show still further assistance wings or general wings in accordance with further embodiments of the invention. The wings are here in these figures shown schematically in cross-sectional views taken through the respective wings parallel to the direction of forward flight and vertically through the respective wings.

All these figures are showing a main wing 2 and an assistant wing 3 in different locations relative to the main wing 2. Each of the assistance wings 3 is provided in these Figures with an assistance propeller 4 or 26, while each main wing 2 has a main propeller 5 or 16. The propellers are driven by respective drive means to revolve. These drive means may be engines, individual power plants or remotely mechanically or electrically driven drive means. I, however, prefer to use my hydraulic motors to drive the propellers; for example, by hydraulic motors 7,6,27, while the mentioned hydraulic motors are driven by a respective pump arrangement which is driven by a prime mover or primary power plant. The hydraulic drive permits an easy laying of pipes as fluid lines and of flexible fluid line hoses. The hoses permit the easy varification of location of the respective wings, motors, propellers, while the pipe fluid lines permit the building of a structure to hold the wings, motors and/or propellers.

Figure 14:
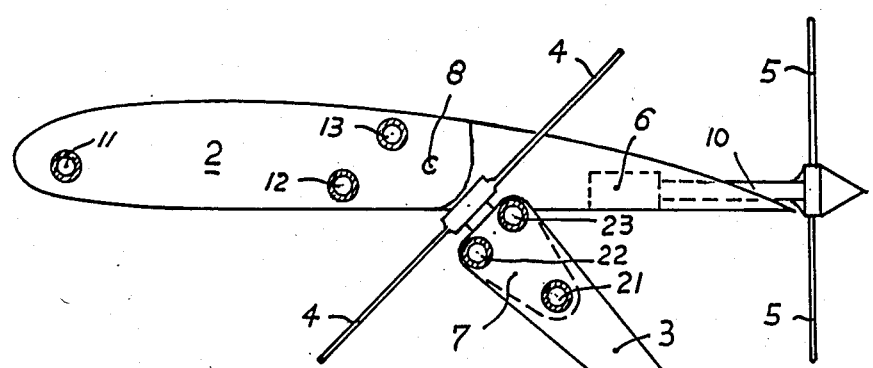
FIG. 14 is a longitudinal sectioonal view through wings of the invention.
Figure 15:
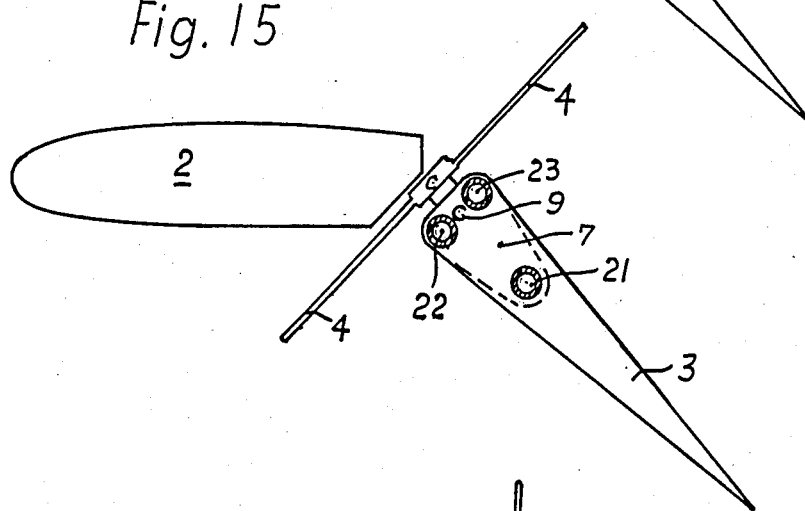
FIG. 15 is a view as in FIG. 14, however with a modified wing portion.
Figure 16:
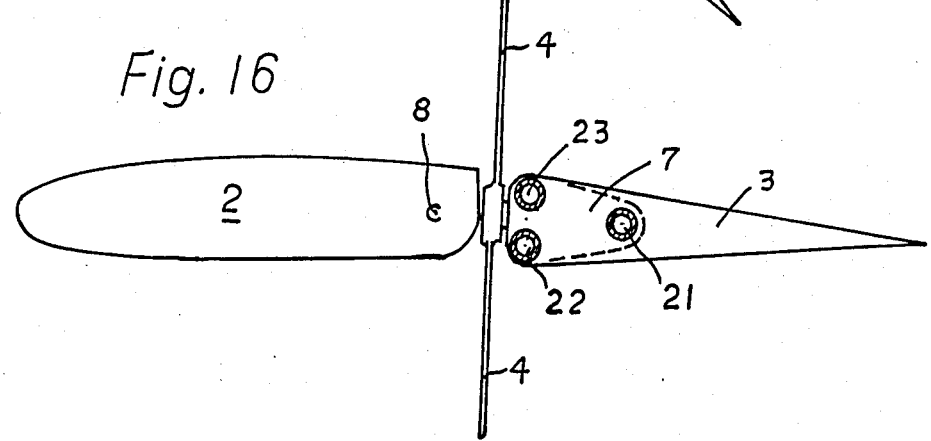
FIG. 16 is a view as in FIG. 14, however with another modification.
Figure 17:
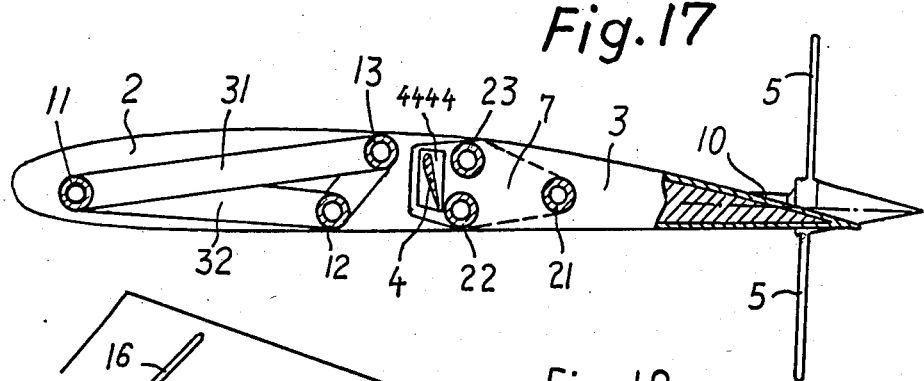
FIG. 17 is a view as in FIG. 14, however with a modification of a portion.

FIG. 14 with FIGS. 15 to 17 show the main wing 2 with a pipe structure 11,12,13 to form the holding bone structure of wing 2 and also to hold the motor(s) 6 to drive the main propeller 5; for example, over shaft 10. One or more of the pipe structures 11,12,13 are commonly used in my devices to carry the fluid to and from fluid motor 6. How the pipes 11 to 13 may form the structure for the wing(s) is shown in FIGS. 20 to 22 by way of example.

Wing 2 is provided with an assistance wing 3. Assistance wing 3 is pivotable around swing center 8 or around swing center 9. The assistance wing 3 is provided with a drive means 7, for example, with hydraulic motor 7, to drive a propeller. And the assistance wing 3 is provided with a propeller 4 or assistance propeller 4, to be revolved by drive means or fluid motor 7.

FIG. 14 shows the main wing 2 and the assistance wing 3 wherein the assistance wing 3 is strongly inclined relative to the main wing 2. This is preferred for take off, landing and in flight with a heavy load. In FIG. 14 the assistance wing 3 is pivoted around the pivot center 8, while it is pivoted in FIG. 15 around a slightly differently located pivot center or swing center 9.

In FIG. 16 the assistance wing 3 is shown in the swung up position for speedy forward flight with utilization of assistance propeller 4.

When, however, the assistance propeller 4 is not required in speedy forward flight and when it would cause additional undesired fuel consumption or drag, the assistance propeller 4 is set to rest and retracted into the main wing 2, as demonstrated in FIG. 17.

In FIG. 17 the assistance propeller 4 is set to rest and the entire assistance wing 3 is retracted forwardly partially into a respective space in the main wing 2. The assistance wing 3 now forms a portion of the main wing 2 and the propeller 4 becomes invisible and retained within the interior of the now main wing 2, which now consists of main wing 2 with assistance wing 3.

The assistance wings 3 may also be formed around a pipe structure 21,22,23. The pipe structures 21,22,23 may again partially or all of them carry hydraulic fluid to and from assistance propeller motor or drive means 7. Drive means 7 or hydraulic motor 7 revolves the assistance propeller 4 and holds and carries it by a respective arrangement. for example a shaft and a flange.

Figure 18:
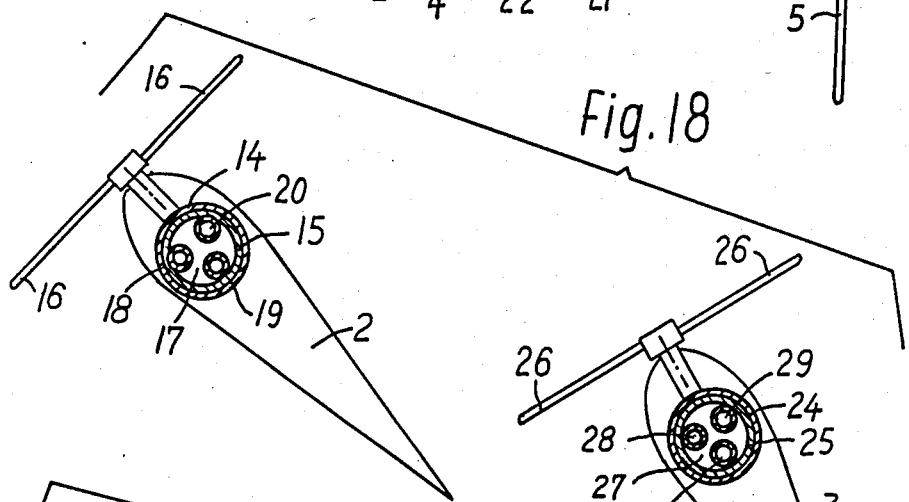
FIG. 18 is a sectional, longitudinal view through wing portions.
Figure 19:
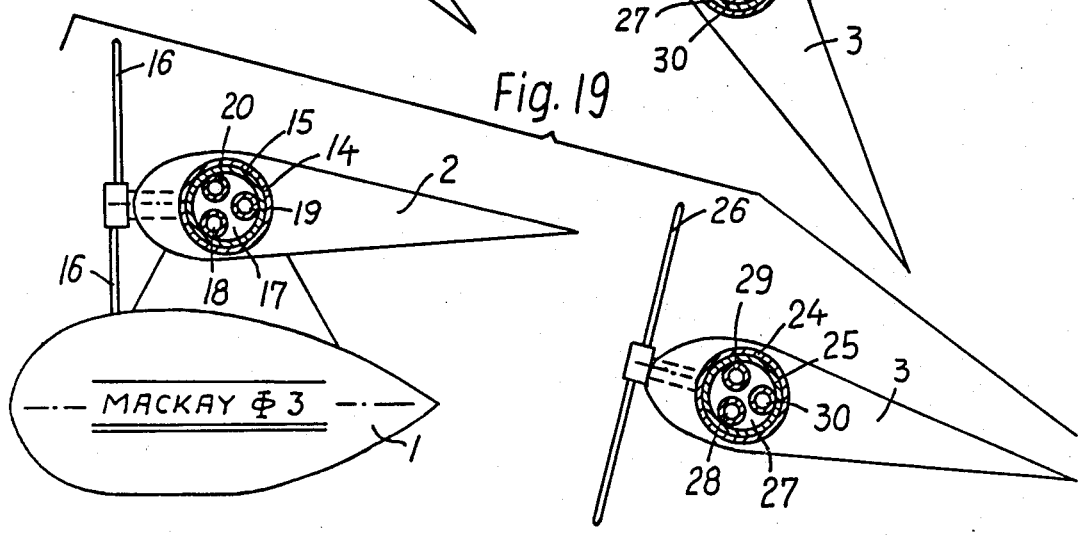
FIG. 19 is a view as in FIG. 18, however with a modification.

In FIGS. 18 and 19 the main wing(s) 2 and/or the assistance wing(s) 3 are pivotably borne in a swing bearing or pivot bearing arrangement 14,15 or 24,25 respectively. The pivot arrangement may consists of a bearing housing 14 for main wing 2 or 24 for assistance wing 3 with a pivotable bearing body 15 therein for main wing(s) 2 and 25 therein for assistance wing 3. The bearing housings 14,24 may be borne on a respective portion of the body of the craft. The pivotable bearing bodies 15,25 may contain portions of the wing pipe structures 18 to 20 for the main wing 2 and 28 to 30 for the assistance wing 3. The pipes 18 to 20 and 28 to 30 may thereby extend through the pivot bodies 15 or 25 respectively, for example, in order to carry on one of their ends the respective fluid motor 4,5,16 or 26, to carry the wing(s) 2,3 and to have on their other ends the connecters to flexible fluid hoses to the respective pump(s).

FIG. 19 shows also how the main wing 2 may be borne on a holder 111 which carries the bearing housing 14 above the cabin 1 of the craft.

In FIG. 18 the main wing 2 and the assistance wing 3 are pivoted in the respective bearing housings 14,24 to a suitable position for almost vertical take off and landing. The assistance propeller 26 therein is adding to a smooth flow of fluid over the main wing 2 to reduce the possibility of stalling. The main propeller in this figure is 16 as well as in FIG. 19. The assistance propeller in FIGS. 18 and 19 is propeller 26.

In FIG. 19 the locations of the pivot bearings housings 14 and 24 are the same as in FIG. 18 respective to the body of the craft, because the housings are preferred to be fixed on the body of the craft. Changed in FIG. 19 compared to FIG. 18 are the angles of inclinations of the wings relative to the horizon or flight direction of the aircraft. The change of direction of inclination of the wing(s) 2,3 is effected by pivoting the respective pivot body 15, 25 in the respective bearing housing 14, 24.

In FIG. 19 the wing(s) 2 and 3 now have the location and inclination suitable for forward flight. The assistance wing 3 still retains in the figure a slight inclination or angle of attack, slightly higher than that of the main wing 2. This is suitable to prevent stalling of the craft or to reduce the possibility of stall by the application of the assistance propeller 26 relative to main wing 2. Propeller 26 serves here to draw fluid over the main wing 2 whereby the possibility of stalling of the craft is reduced. When, however, the craft flies with high forward speed, it may not be necessary any more to consider the possibility of stalling, and the drag may become more important for consideration. The assistance wing 3 of FIG. 19 may then be swung or pivoted to a smaller angle of attack, for example to an angle substantially similar to that of the main wing 2 of FIG. 19. The term "pivotion" describes a pivoting or a pivotal movement.

The pivotion of the main wing 2 and/or of the assistance wing 3 may be effected in unison by a common controller, if so desired. It is often, however, also at least temporarily suitable to control the angle of attack of the main wing 2 and of the assistance wing 3 individually. Especially when the craft nears the flight speed of forward flight or when the craft enters acrobatics, where the possibility of stalling could become possible.

FIG. 20 gives simple calculation formulas for a number of configurations of propellers. These calculations are first estimates and do not claim absolute accuracy. However, the accuracy appears to be close enough for first estimates of the resistances, which are also called drag(s) and for the torques of the respective propellers. Also, from them the integral medial radii can be found and the power(s) reqired. These formulas are, for example, very helpful to design the resistance or drag bodies or flaps 8,88 of the invention, to change a helicopter into a glider, when the engine(s) or power supply(ies) fail. They are also helpful for the calculation of the blades of helicopters generally.

FIG. 20 explains, how I have developed the equations of FIG. 21. Since everything in FIGS. 20 and 21 is written in strictly useable mathematical terms with defined technological sizes and configuration(s), the FIGS. 20 and 21 are self-explanatory and do not require any further description here. If further information is desired, the inventor might be contacted at his permanent residence, which will appear on the applied for patent. It is recommended to calculate the respective propeller for 1000 RPM. Any other values for other RPM can then be found by multiplying the obtained value with the 2nd power of the fraction (RPM/1000), namely by: $(RPM/1000)^2$.

FIG. 22 explains the basic values of the physics involved with helicopter propellers. Figure portion "B" explains the propeller with its medial chord "B" and with its integral medial resistance and torque responsive integral radius "R". This integral medial radius is 0.7 in blades with equal chord "B" but it reaches higher values, for example at up to higher than 0.77 in the propeller types 3 of FIG. 20. Figure portion "C" shows the airstream through the propeller, from which the equations and novel results of my earlier application Ser. No. 05-973,780, now U.S. Pat. No. 4,358,073; are obtained. Figure portions "D" and "E" demonstrate how the situation of Figure portion "A" is changing, when the axis of the propeller is inclined. "D" shows the range of economic helicopter flight, where the power required is less than in hovering, while portion "C" shows an uneconomic speedy flight range, where the power required is higher than in hovering and much higher than in the economic flight of "D" at lower speed. For the calculation of the propeller usually the angle of attack "delta" of Figure portion "A" is to be used. Since, however, the propeller at hovering or at vertical flight must also accelerate the airstream of Figure portion "C", the propeller will at this stage have to use the angle of attack "alpha". The angle of attack "beta" is then the angle of attack required to accelerate the airstream of Figure portion "C". This angle of attack and this power required thereby is commonly much higher than the angle of attack "alpha" and the power required by it.

When, however, the helicopter flies forward with a certain forward speed "Vo" the propeller moves out of the downward airstream of Figure portion "C" whereby the angle of attack required reduced to "delta". The power required is then drastically reduced and the economic flight range of Figure portion "D" is obtained. When a constant pitch of angle "alpha" is used, the RPM of the propeller can be and will be respectively reduced, whereby the power requirement reduces.

What is claimed, is:
1. An aircraft, comprising, in combination;
a body with a pair of first wing portions which extend laterally from said body with one portion of said portions extending to the left from said body and the other of said portions extending to the right from said body whereby said portions form a set of first wing portions relative to said body, a power plant, at least one pair of propellers with transmission means to transfer the power from said power plant to said propellers to revolve said propellers and a pair of second wing portions with one portion of said second wing portions extending to the left from said body while the other portion of said second wing portions extends to the right from said body;
wherein said second wing portions are inclinable downwards with their rear ends relative to first wing portions;
wherein said first wing portions are the main wings which are provided fixed to the body of the craft to carry the body of the craft as an aircraft flying on said first wing portions forward with relative high forward speed;
wherein said second wing portions are located behind said first wing portions and provided with propellers before them with axes of said propellers in a fixed angle relative to the medial line of the chord of said second wing portions;
wherein said second wing portions are variable between a rearmost location and a frontmost location and in any location therebetween;
wherein said rearmost location is defined by a downwards inclination of the rear ends of said second wing portions relative to said first wing portions;
wherein said propellers are revolved at said rearmost location of said second wing portions to create an airstream over at least said second wing portions while partially sucking an airflow over said first wing portions; and;
wherein said propellers are insertable into respective spaces in said first wing portions to stop their revolving and to set them in a position parallel to the rear ends of said first wing portions while said rear ends of said first wing portions are provided with containment spaces to temporarily receive therein said propellers and said propellers are located in said containement spaces and said second wing portions are moved forward to obtain said frontmost location while said frontmost location is obtained when second wing portions are moved towards said first wing portions to combine with said first wing portions to a single pair of wing portions with said propellers set to rest in said containment spaces.

2. The aircraft of claim 1,
wherein said pair of first wing portions is provided with a pair of first propellers with one propeller of said pair of first propellers provided on said first wing portion which extends to the left from said body and the other of said propellers of said first pair of propellers is provided on said first wing portion which extends to the right from said body;
wherein said propellers of said second wing portions and said pair of first propellers revolve in unison to drive said aircraft when said second wing portions are located in sair rearmost location; and;
wherein said pair of first propellers drives said aircraft when said second wing portions are set into said frontmost location with said propellers of said second pair of wing portions set to rest in said containment spaces.

3. An aircraft capable of travel in air, comprising, in combination, wing portions extending laterally from an aircraft's body,
wherein second wing portions are provided behind first wing portions, while said first and second wing portions are provided with means to change their locations and angular relationships relative to the other of said first and second wing portions;
wherein propellers are provided between said first and second wing portions; and;
wherein said propellers are borne in drive means in said second wing portions to bear the axes of the drive shafts of said propellers in said second wing portions;
wherein said second wing portions are inclinable downwards with their rear ends relative to first wing portions;
wherein said first wing portions are the main wings which are provided fixed to the body of the craft to carry the body of the craft as an aircraft flying on said first wing portions forward with relative high forward speed;
wherein said second wing portions are located behind said first wing portions and provided with propellers before them with axes of said propellers in a fixed angle relative to the medial line of the chord of said second wing portions;
wherein said second wing portions are variable between a rearmost location and a frontmost location and in any location therebetween;
wherein said rearmost location is defined by a downwards inclination of the rear ends of said second wing portions relative to said first wing portions;
wherein said propellers are revolved at said rearmost location of said second wing portions to create an airstream over at least said second wing portions while partially sucking an airflow over said first wing portions; and;
wherein said propellers are insertable into respective spaces in said first wing portions to stop their revolving and to set them in a position parallel to the rear ends of said first wing portions while said rear ends of said first wing portions are provided with containment spaces to temporarily receive therein said propellers
and said propellers are located in said containement spaces and said second wing portions are moved forward to obtain said frontmost location while said frontmost location is obatined when second wing portions are moved towards said first wing portions to combine with said first wing portions to a single pair of wing portions with said propellers set to rest in said containment spaces.

* * * * *